(12) United States Patent
Thaler et al.

(10) Patent No.: US 8,014,423 B2
(45) Date of Patent: Sep. 6, 2011

(54) REFERENCE TIME DISTRIBUTION OVER A NETWORK

(75) Inventors: Thomas Thaler, Maennedorf (CH);
   Georg Dickmann, Duebendorf (CH);
   Eric Roth, Jona (CH); Christoph Heidelberger, Zurich (CH)

(73) Assignee: SMSC Holdings S.a.r.l., Luxembourg (LU)

( * ) Notice: Subject to any disclaimer, the term of this patent is extended or adjusted under 35 U.S.C. 154(b) by 1081 days.

(21) Appl. No.: 09/785,598

(22) Filed: Feb. 16, 2001

(65) Prior Publication Data

US 2001/0024455 A1    Sep. 27, 2001

Related U.S. Application Data

(60) Provisional application No. 60/183,617, filed on Feb. 18, 2000, provisional application No. 60/246,012, filed on Nov. 3, 2000.

(51) Int. Cl.
   *H04J 3/06*    (2006.01)
   *H04J 3/00*    (2006.01)

(52) U.S. Cl. ........................................ 370/503; 370/520

(58) Field of Classification Search .................. 330/241, 330/252, 498, 503, 508, 516, 517, 389, 400, 330/401, 402, 520
   See application file for complete search history.

(56) References Cited

U.S. PATENT DOCUMENTS

| | | | | |
|---|---|---|---|---|
| 4,285,064 A | * | 8/1981 | Hodge | 455/13.1 |
| 5,530,846 A | * | 6/1996 | Strong | 713/400 |
| 5,621,895 A | * | 4/1997 | Weis et al. | 370/407 |
| 5,798,732 A | * | 8/1998 | Eshenbach | 342/357.12 |
| 6,032,261 A | * | 2/2000 | Hulyalkar | 713/400 |
| 6,199,169 B1 | * | 3/2001 | Voth | 713/400 |
| 6,275,544 B1 | * | 8/2001 | Aiello et al. | 375/326 |
| 6,370,138 B1 | * | 4/2002 | Kim et al. | 370/353 |
| 6,591,370 B1 | * | 7/2003 | Lovett et al. | 713/502 |
| 6,678,781 B1 | * | 1/2004 | Domon | 710/312 |
| 6,735,711 B2 | * | 5/2004 | Lutz | 713/500 |
| 6,778,543 B1 | * | 8/2004 | Frouin et al. | 370/402 |
| 6,914,895 B1 | * | 7/2005 | Straub et al. | 370/350 |
| 2006/0013223 A1 | * | 1/2006 | Lym et al. | 370/389 |

FOREIGN PATENT DOCUMENTS

GB    EP 0946003    *    9/1999
(Continued)

OTHER PUBLICATIONS

Weidemann, Werner. "Application Critical Parameters for Rubidium Standards". IEEE. May 27-29, 1998. pp. 84-87.*

(Continued)

*Primary Examiner* — Ronald Abelson

(57) ABSTRACT

A reference time distribution system and method use a data transmission network having a plurality of nodes to distribute the House Sync signal. A network-wide time signal is generated using a reference time generator, and the network-wide time signal is then distributed over the network to the plurality of nodes. At each node, the network-wide time signal is converted to a local synchronization signal for use in performing synchronization of the timing of each node. Either network-inherent timing and/or additional time signaling is used to provide the nodes attached to this network with a network-wide notion of time. The time information is converted locally into synchronization signals or time information as required by a respective application. When data is transported over the network, delay compensation is performed to simultaneously output different data streams that have been synchronously input into the network, regardless of the data path.

16 Claims, 5 Drawing Sheets

FOREIGN PATENT DOCUMENTS

WO   WO 99/55028   * 10/1999

OTHER PUBLICATIONS

"Enhancement to Audio and Music Data Transmission Protocol 1.0", TA Document 1999014, 1394 Trade Association, Santa Clara, California, U.S.A.; Jul. 10, 2000; 53 pages.

"Issues Related to Synchronization of Digital Media in IEEE 1394", Public E-mail Discussions of the Audio Engineering Society Standard Committee SC-06-02 Group, from Feb. 1, 1998 to Oct. 19, 1999; 113 pages.

"SMPTE Time Code and Sample Count Transmission Protocol Ver. 1.0", TA Document 1999024, 1394 Trade Association, Santa Clara, California, U.S.A.; Oct. 24, 2000; 22 pages.

A. Goldstein, "AES SC-06-02 Minutes Sep. 22, 2000", Meeting of the Audio Engineering Society Standards Committee; Sep. 22, 2000; 5 pages.

J. Fujimori et al., "Digital Audio Transmission Over IEEE 1394: Protocol Design and Implementation", 103rd Audio Engineering Society Convention, New York, New York, U.S.A., Sep. 26, 1997; 7 pages and 12 figures; Preprint No. 4547, published by the Audio Engineering Society.

H. Kuribayashi et al, "A Supplement to Audio and Music Data Transmission Protocol over IEEE 1394":, 105th Audio Engineering Society Convention, San Francisco, California, U.S.A., Sep. 26, 1998; 5 pages and 8 figures; Preprint No. 4762, published by the Audio Engineering Society.

R. Laubscher et al., "A 1394-Based Architecture for Professional Audio Production", 109th Audio Engineering Society Convention, Los Angeles, California, U.S.A., Sep. 22-25, 2000; 9 pages; Preprint No. 5246, published by the Audio Engineering Society.

B. Moses et al., "Audio Distribution and Control Using the IEEE 1394 Serial Bus", 103rd Audio Engineering Society Convention, New York, New York, U.S.A.; Sep. 26, 1997; 18 pages and 6 figures; Preprint No. 4548, published by the Audio Engineering Society.

M. Poimboeuf, "Hierarchical Protocol and Process for Synchronization of Isochronous Transfers on the IEEE 1394 Bus for Professional Audio and Video Media Data Streams", Draft AES-X60 Standard Proposal, Revision 0.0; May 11, 1998; 2 pages.

J. Strawn, "Current Situation, Future Work", Public E-mail to the Audio Engineering Society Standard CommitteeSC-06-02 Group; Apr. 12, 2001; 5 pages.

"Issues Related to Synchronization of Digital Media in IEEE1394", Public E-mail Discussions of the Audio Engineering Society Standard Committee SC-06-02 Group, from Feb. 1, 1998 to Oct. 19, 1999; 113 pages.

* cited by examiner

REFERENCE TIME DISTRIBUTION OVER A NETWORK

CROSS-REFERENCE TO RELATED APPLICATIONS

This application is related to and claims priority from U.S. provisional application No. 60/183,617, filed Feb. 18, 2000, and to U.S. provisional application No. 60/246,012, filed Nov. 3, 2000, the specification of each provisional application being incorporated herein by reference.

FIELD OF THE INVENTION

The present invention relates to the synchronization of devices contained within a synchronization domain. More particularly it relates to the provision of a reference time within a distributed network of diverse applications, including multimedia content production or entertainment equipment.

BACKGROUND OF THE INVENTION

Interconnected multimedia devices require at least pair-wise links for the transmission of content information and mutual synchronization information. Most multimedia content production facilities provide dedicated links for the transport of content information to a master console for further integration or processing and the transport of a synchronization (sync) signal, commonly referred to as a House Sync signal.

The House Sync guarantees synchronicity of all connected devices. Different devices often require different frequencies or formats of synchronization signals. For example, audio sampling frequencies may be at 22.05, 32, 44.1, 48, 88.2, 96, 176.4, or 192 kHz, and video frame sync may occur at frame rates of 24, 25, 29.97 or 30 Hz. In a production facility, dedicated cabling is used to transmit one or more of these synchronization signals to every single device. This infrastructure relies additionally on central or distributed conversion units for the conversion between different synchronization signals or the regeneration of one or more synchronization signals. Use of conversion units must be planned carefully in order to avoid phase ambiguities.

Links for the transport of audio and video signals are mostly connections independent from the House Sync. With a growing number of interconnected devices, the connections in a content production facility becomes increasingly complex and requires careful planning. Rearrangement or extension of the infrastructure is often difficult to achieve.

A need exists for distribution of reference timing signals which avoids the disadvantages of the prior art, such as signal delays and complexity of the cabling of the network.

SUMMARY OF THE INVENTION

The disclosed reference time distribution system and method use a data transmission network having a plurality of nodes to distribute the House Sync signal and/or other synchronization signals. A network-wide time signal is generated using a reference time generator, and the network-wide time signal is then distributed over the network to the plurality of nodes. At each node, the network-wide time signal is converted to a local synchronization signal, and synchronization of the timing of each node is performed using the local synchronization signal.

Either network-inherent timing and/or additional time signaling is used to provide the nodes attached to this network with a network-wide notion of time. This time information is converted locally into synchronization signals and/or time information as required by a respective application. Synchronization signals of different types or frequencies are simultaneously distributed from different nodes within the network to applications or devices. Synchronization signals of the same type are phase aligned. Similarly synchronization signals of different type have a deterministic phase relationship. When data is transported over the same network, delay compensation may be performed to simultaneously output different data streams that have been synchronously input into the network, regardless of the data path.

DETAILED DESCRIPTION OF THE PREFERRED EMBODIMENTS

The disclosed reference time distribution system and method performs synchronization within a distributed network of multimedia content production or entertainment equipment, as well as for other applications such as content contribution, distribution, and/or broadcasting; consumer multimedia; control applications, etc.

Figure 1:
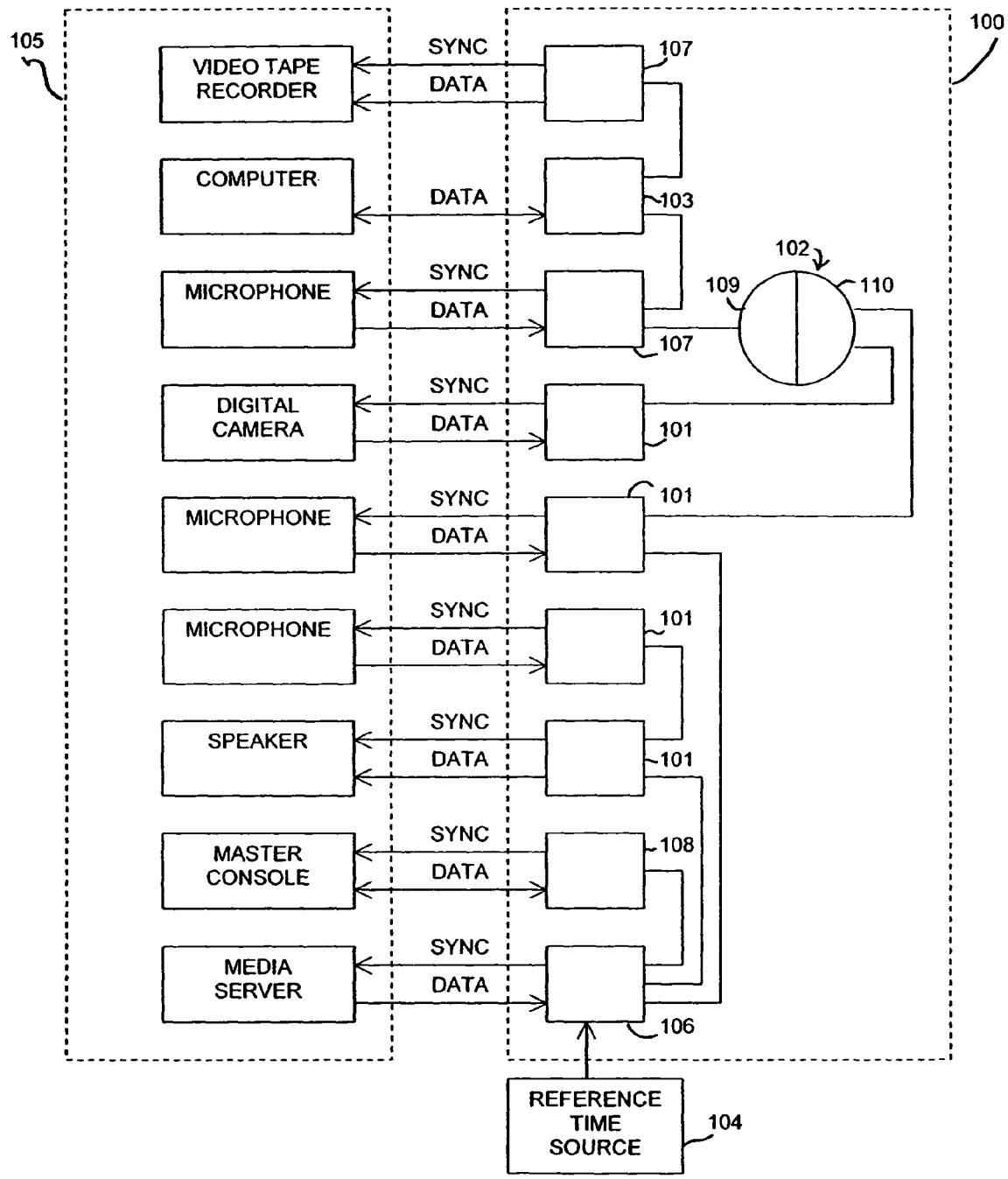
FIG. 1 illustrates the distribution of a reference time signal over an IEEE 1394 serial bus and the provision of appropriate synchronization signals to a variety of media devices.

As shown in FIG. 1, the disclosed reference time distribution system and method are used in a network 100 of nodes 101, 103, 106, 107, 108, 109, 110. The nodes 109 and 110 may function as portals for the network 100, and the nodes 101, 103, 106, 107, 108, 109, 110 may be either connected directly to each other and/or having one or more network devices 102 with the nodes 109 and 110, acting as portals, connecting the network segments to each other. The network 100 may include a plurality of such network devices, such as bridges, gateways, switches, routers, or other connections or interfaces between nodes and their associated applications and devices. When such network devices 102 are used between nodes, the nodes are not required to be identical and/or compatible with each other, since the network devices 102 may provide a bridging interface between different communications protocols and standards implemented in the nodes.

The plurality of network devices may be wired, wireless, or a combination thereof, so the overall network 100 may be a wired network, a wireless network, or a heterogeneous combination of wired and wireless components and communications channels. The information and signals transmitted over the network 100 may be electromagnetic, wireless, and/or data packets; for example, the distributed reference time signals or information may be transmitted over the network 100 as data packets.

The network 100 may be, in a preferred embodiment, an IEEE 1394-type network and as such the network 100 provides a mechanism for time distribution. In an IEEE 1394 bus, a single node, the cycle master 106, transmits at regular intervals the contents of its cycle time register encapsulated in cycle start packets to all other nodes 101 within the same bus, overwriting their own cycle time register with the received value. Independent from cycle start packets, each node 101, 103, 106, 107, 108, 109, 110 increments its cycle time register by one at a nominal rate of about 24.576 MHz. In an IEEE 1394 network, formed of two or more buses, a single cycle master 106 takes the role of net cycle master.

Bridges 102 between buses detect differences between the cycle time registers of the cycle masters of adjacent buses. For example, referring to FIG. 1, a first bus may be represented by the nodes 101, 106, 108, 110 operating as one bus, and a second bus may be represented by the nodes 103, 107, 109 operating as another bus, with the first and second buses being adjacent buses. The bridges 102 then perform adjustment of the cycle master, for example, node 103, of the bus that is further away from the net cycle master 106. If the cycle master that needs to be adjusted is not contained within the bridge 102, this adjustment is controlled by the transmission of cycle master adjustment packets from the bridge portal 109 to the cycle master 103. The IEEE 1394 arbitration scheme ensures that a cycle start packet has access to the bus once in about every 125 μs. The exact time of transmission depends on the value of the cycle master's cycle time register and ongoing asynchronous traffic. Cycle start packets are delayed on their way from the cycle master to other nodes. This delay depends on the distance between cycle master 106 and the receiving nodes 101, 108, 110, the number of nodes on the path in-between, and the individual hardware of each node involved in transmitting, forwarding and receiving the cycle start packet. This delay typically includes a significant jitter component, i.e. it is different for any two packets transmitted over the same path.

Each cycle start packet marks the start of a cycle within a bus. Following a cycle start, isochronous packets may be transmitted, followed by asynchronous packets. The periodic occurrence of cycle start packets guarantees a high level of quality of service, such as maximum latency, to isochronous packets. The value of a cycle time register is also used to timestamp video and audio streams as defined in the International Engineering Consortium (IEC) standards IEC 61883-1 through 61883-6.

A node receiving a media stream is enabled to recover the signal clock of the media source using the timestamp. Receiving nodes perform clock recovery independently for every stream. In a networked environment with many participating media devices, this situation requires a large number of clock recovery stages and leads to many different clocks, namely different signal clocks, the cycle clock of the underlying serial bus, and eventually the House Sync. Although some of these clocks may have identical nominal values, in the prior art, phase and frequency variations occur and cause poor alignment of previously strictly aligned media streams. The disclosed reference time system and method adjusts for such phase variation, as described herein.

A preferred embodiment of this invention makes further use of the cycle time register contents to derive synchronization signals in every node implementing the disclosed invention, independent from traffic over the IEEE 1394 network. It further implements measurement and compensation of the delay which a cycle start packets incurs when traveling from the cycle master to another node. This measurement relies on pinging, a method generally known in the art, but not with respect to this application. The conversion process from cycle time register contents to a synchronization signal also includes smoothing of cycle start packet delay jitter.

In one embodiment, a network-wide notion of time within each node 101, 103, 106, 107, 108, 108, 109, 110 is obtained by reference to the values of cycle time and bus time registers of a unique node within the network 100, such as the net cycle master 106 or the prime portal 110. Referencing a unique node's cycle and bus time registers may rely on a local node's cycle and bus time registers, complemented by information about their differences to the unique node's cycle and bus time register values. A local node may update this information after it has detected or has been notified of a potential change of network time.

In a network containing bridges, bridge portals may assume the tasks of notifying local nodes about potential network time changes, and holding the required time information for retrieval by local nodes. Due to message propagation time, time differences between distant nodes are not readily available. The cycle time distribution process ensures approximate alignment of cycle time within a local bus. A subset of bus time is overlapping with cycle time, while another subset of bus time is independent for any node in the network. The distribution of network time uses the time difference information within network devices between buses to update timing information traveling across buses. Also, the overlapping of cycle and bus time is used to estimate and subsequently correct errors that may have been introduced by message propagation delay.

A reference time source 104 may be used in the network 100 to generate and provide a network-wide time signal to the network 100, and in particular to a first node 106 of the plurality of nodes 101, 103, 106, 107, 108, 109, 110. In one embodiment, the reference time source 104 may be a clock unit connected to the network 100, with the clock unit including timing circuitry or signal generators operating independent of the rest of the network 100. Alternatively, the reference time source 104 may be a clock or oscillator incorporated in an arbitrary node of the nodes 101, 103, 106, 107, 108, 109, 110 of the network 100. The network 100 supports and transports both the reference time signal and data signals, without the need for additional infrastructure to segregate the paths of the reference time and data signals.

The individual nodes 101, 103, 106, 107, 108, 109, 110 may generate local synchronization signals, as respective sync signals, from the network-wide time signal. The appropriate sync signal from a node, for example, node 108, is transmitted to the applications or devices 105 connected to a particular node, such as the node 108. It is to be understood that each node 101, 103, 106, 107, 108, 109, 110 may be connected by a single connection or multiple connections to the network 100, for example, an IEEE 1394 network. In addition, it is to be understood that each node 101, 103, 106, 107, 108, 109, 110 may generate and output multiple synchronizations signals, including different synchronization signals for different applications 105 and devices. Furthermore, each node 101, 103, 106, 107, 108, 110 may be connected to and/or have multiple interfaces to one or more applications 105 or devices, for example, depending on the type of application and its need for the node-generated synchronization signal or signals.

In alternative embodiments, some nodes, such as node 103 shown in FIG. 1, may only transmit data and not transmit any synchronization signal; for example, node 103 may be a node or other network device not implementing reference time distribution. For example, node 103 may not have the requisite distribution configuration or circuitry, or may be configured to not distribute the network-wide reference time, or may have such distribution circuitry intentionally blocked or disabled from operating. In one embodiment, node 103 may represent a non-IEEE-1394-compatible network device which does not support or is incapable of such reference time distribution.

In another embodiment, node 103 may be a node dedicated to operate with specific devices which may not require such reference time distribution; for example, a stand-alone computer such as a personal computer (PC) or terminal, as well as a personal digital assistant (PDA) and/or other mobile, pure media, and/or multimedia devices, which may connect to the network 100 through the dedicated nodes 103 to receive data therefrom; for example, web pages over the Internet. In another embodiment, node 103 may include docking-ports for mobile devices and/or applications and devices 105 which exchange data in either direction to and/or from the network 100 through the node 103, and which may be disconnected from the network 100 for independent operation.

The plurality of applications 105 may be multimedia devices such as a video tape recorder, a computer, a microphone, a digital camera, a speaker, a master console, a media server, equipment control devices, multimedia content production or entertainment equipment, etc., which receive the sync signal and/or an SMPTE/EBU timecode, and transmit and/or receive data signals from their respective nodes. Alternatively, one or more of the applications 105 may support pure media, such as audio only (pure audio) and/or video only (pure video), and/or other types of sensory communications signals, as well as fixed, dynamically changing, or selectable combinations thereof.

The applications 105 and/or devices may respectively be external, internal, or hybrid external/internal devices relative to the network 100. For example, a given application, sets of applications, or the entire plurality 105 of applications may form one or more nodes of the network 100 as well, and so may be incorporated into the network 100, such that the nodes 101, 103, 105, 106, 107, 108, 109, 110 form a single entity. Accordingly, interfaces between the nodes, such as interfaces to the entity 105, are not visible externally to other entities connected to the network 100 and/or to the applications of the entity 105.

In a preferred embodiment, a IEEE 1394-compliant serial bus is used with the nodes 101, 103, 106, 107, 108, 109, 110 and/or the bridge 102 to integrate different digital data streams and/or data packets within a single network. Using isochronous streaming techniques known in the art, both a required transmission bandwidth and a maximum transmission delay are guaranteed.

The disclosed reference time system and method enable nodes on one or more interconnected IEEE 1394 serial buses to distribute the House Sync as the sync signal. One node within the IEEE 1394 network, for example, the node 106, connected to the reference time source, issues a central synchronization signal derived from the reference time source 104, implemented using an external clock source optionally having, for example, outstanding or substantially high precision as a rubidium-based reference, a global positioning system (GPS) reference, or a reference to a mains frequency known in the art. Alternatively, the reference time source 104 may have a relatively low precision and/or may be internal to any arbitrary one of the nodes 101, 103, 106, 107, 108, 109, 110 of the network 100.

A serial bus node of the nodes 101, 103, 106, 107, 108, 109, 110 is configured in a manner known in the art, by software and/or hardware, to provide a desired format of the network-wide sync signal, so that the disclosed system and method simultaneously provide different local synchronization signals within an IEEE 1394-based network, to integrate both data transport and associated synchronization within an IEEE 1394 serial bus infrastructure. That is, each respective application 105 receives an appropriate sync signal from its respective node. An IEEE 1394 serial bus network so configured thus performs as a synchronous data transport network. Ease of scalability and cabling of the disclosed system and method are the same as for any IEEE 1394 serial bus network, and implementation of the disclosed system and method in a 1394 node does not prevent the node from being IEEE 1394 standard compliant. In addition, a standard compliant IEEE 1394 node not implementing the disclosed reference timing system and method does not prevent other nodes from providing the services enabled by the disclosed system and method.

Communication between multimedia devices 105 requires both data links and synchronization between interconnected devices. In a preferred embodiment of the present invention, data and synchronization information is carried over the network 100 using an IEEE 1394-type serial bus. In particular, the entire network 100 may be an IEEE 1394 serial bus-based network having the individual nodes 101, 103, 106, 107, 108, 109, 110 and any bridges 102 with bridge portals 109 and 110, interconnecting two or more serial buses. Nodes 101, 106, 107, 108 implement the reference time distribution, and the reference time source 104 provides a stable timing signal to the net cycle master implemented in a specific node, such as node 106, which distributes the cycle time over the network 100 for use by the other nodes 101, 103, 106, 107, 108, 109, 110.

In an alternative embodiment, the net cycle master node 108 generates the cycle master signal, but a different node, such as node 106, may adjust the net cycle master, with node 106 being the reference node of the network 100 although node 106 is not the net cycle master node. This adjustment process may use cycle master adjustment packets. In particular, the network 100 may be an IEEE 1394 network, with such configurations of the net cycle master node and the reference node being supported by the IEEE 1394 network.

Nodes 101, 103, 106, 107, 108, 109, 110 derive local synchronization signals for their respective applications from cycle time and bus time information. Cycle time and bus time information may consist of both the values of a node's local cycle and bus time registers, as well as knowledge about these values within other nodes and knowledge about the difference between local and remote values. The reference time source 104 may be connected to any other node capable of propagating the network-wide reference time signal to one or more of the nodes 101, 103, 106, 107, 108, 109, 110 of the network 100.

Figure 2:
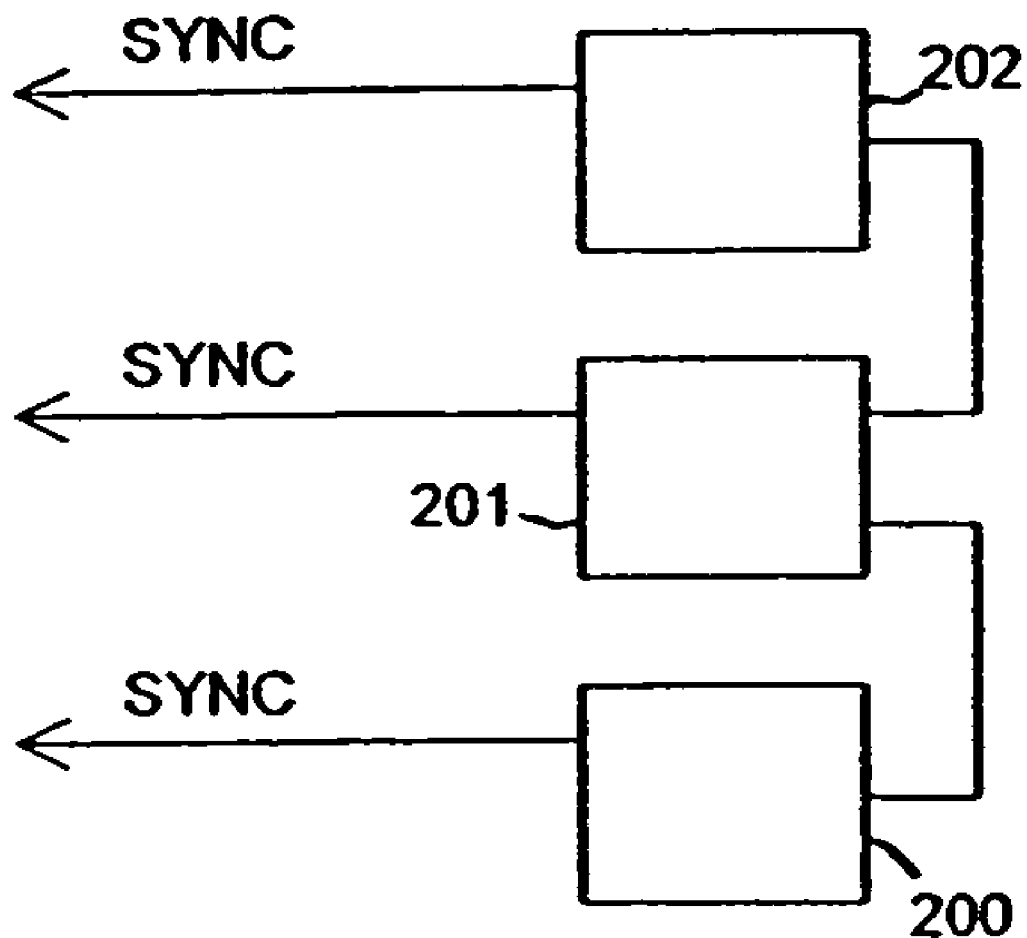
FIG. 2 illustrates a node set with timing phase correction.

Referring to FIG. 2, a subset of the network 100 is illustrated to describe the timekeeping functions of the disclosed system and method, with a single node 200 connected to other nodes, such as node or network device 201, and in turn to another node 202 through the intervening node 201. Timekeeping is performed by the exchange of cycle time and bus time information, or subsets thereof from a single node 200 to other nodes 201 and 202 in the IEEE 1394 network. Every node 200, 201, 202 tracks and stores the packet propagation delay between the cycle master and itself, and every node 200, 201, 202 respectively adjusts the phase of the synchronization output (sync signal) to its respective media application 105 or devices accordingly. The local synchronizations signals may have different frequencies, but two sync signals of identical frequency are phase-aligned regardless of their physical location. Thus phase alignment between the synchronization signals issued by different nodes to media applications and devices is achieved. Accordingly, the notion of time of each node 200, 201, 202 is unaffected by the packet propagation delay between nodes 200, 201, 202.

Figure 3:
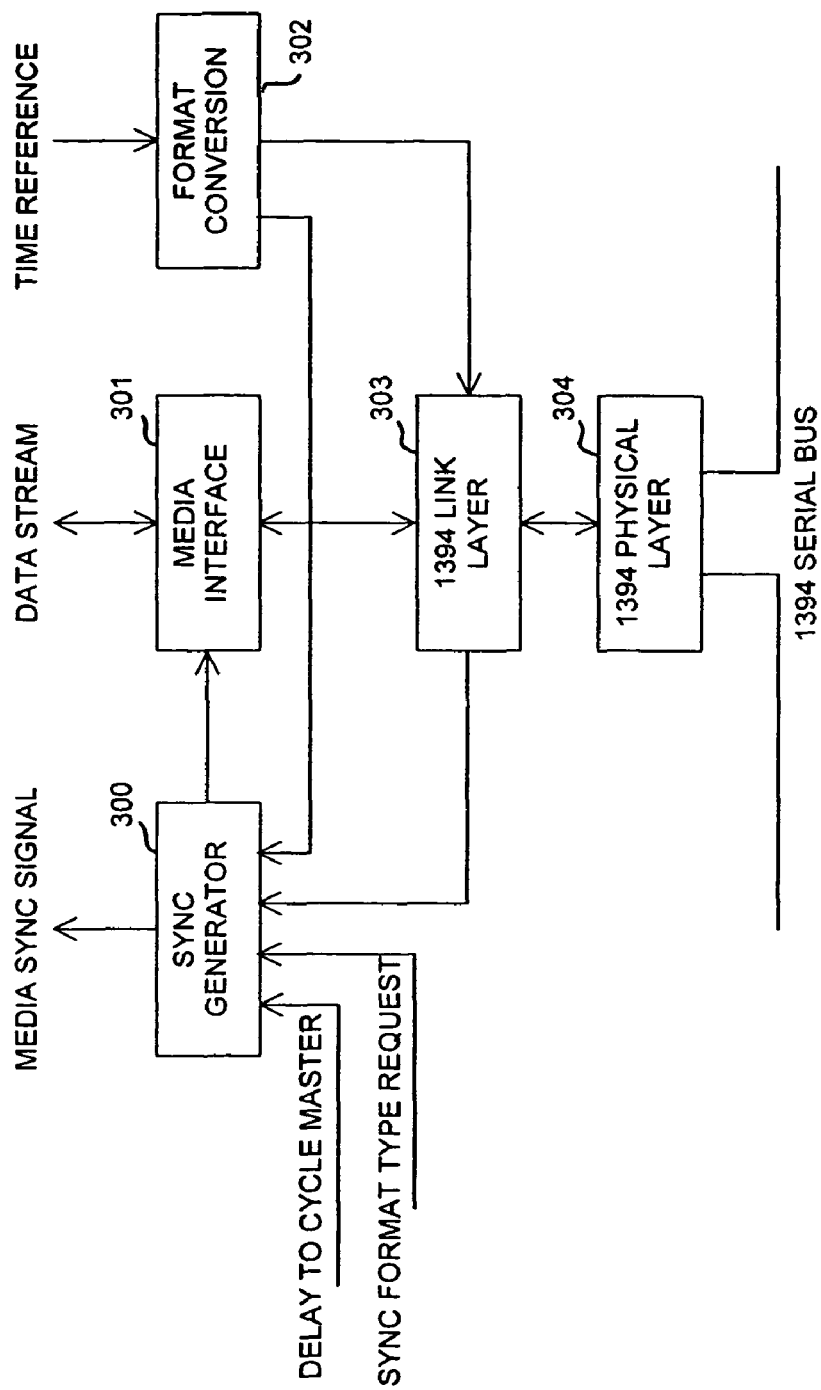
FIG. 3 illustrates in more detail the internal fabric of an IEEE 1394 node with the capability of reference time distribution.

Referring to FIG. 3, the components of a typical node 101, 103, 106, 107, 108 are shown, in which a node includes a sync generator 300 connected to a media interface 301, which in turn is connected to an IEEE 1394 link layer 303. The link layer 303 is connected to a format conversion unit 302, as well as to the sync generator 300 and to an IEEE 1394 physical layer 304. The sync generator 300 receives the delay-to-cycle master signal as obtained by pinging, and a sync format type request to generate a media sync signal for a respective application or device 105 connected to the respective node. The sync signal is also provided to the media interface 301 for controlling the input and output of a data stream. The format conversion unit 302 receives the time reference signal as the network-wide time signal, and converts the signal to an appropriate signal format for use by the IEEE 1394 link layer 303. The physical layer 304 is connected to the IEEE 1394 serial bus and thence to other nodes and/or bridges 102.

Therefore, internally, a node's cycle and bus time information contained in the link layer 303 and the sync generator unit 300 is governed by an external time reference through the format conversion unit 302. In a preferred embodiment, in the disclosed time distribution system and method, only a single node in the network 100 uses this path. In one embodiment, all other nodes in the network 100 either lack the format conversion unit 302, or have the unit 302 deactivated or not implemented, so such nodes lacking a functioning unit 302 obtain cycle and bus time information over the IEEE 1394 serial bus via the physical layer 304. The sync generator 300 generates the requested media sync signal upon cycle and bus time from the link layer 303 and knowledge of the propagation delay to the cycle master of the local bus and, eventually, knowledge of bus time and cycle time of remote nodes.

In another embodiment, for a reference node 106, the format conversion unit 302 may be missing or deactivated, and the node 106 may use an internal reference clock of high or low precision to perform its functions. In alternative embodiments, for low precision applications, such propagation delays to the cycle master of the local bus may be ignored.

Figure 4:
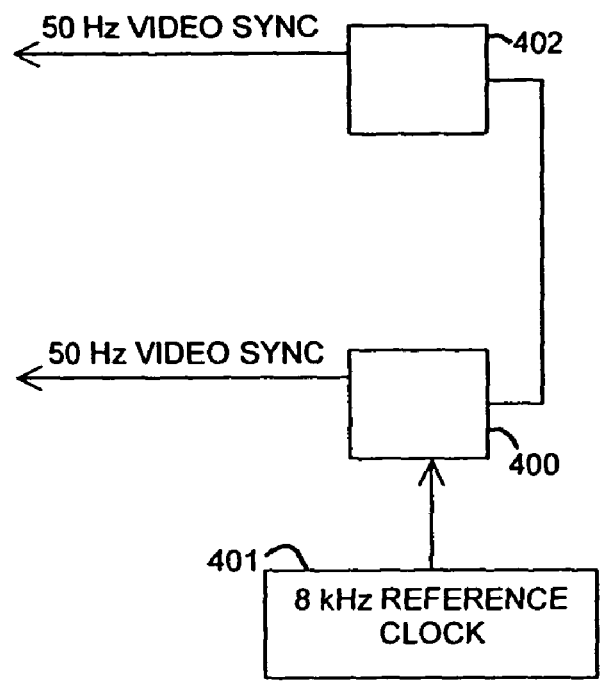
FIG. 4 illustrates the generation of multiple phase aligned synchronization signals with frequencies other than the frequency of a central frequency reference.

Referring to FIG. 4, another subset of the nodes of the network 100 is shown to illustrate generation of the local synchronization signals to respective applications or devices 105, as in FIG. 1. The nodes 400, 402 are connected to a reference clock 401 of a predetermined frequency. The reference clock 401 may be the reference time source 104 of FIG. 1, or may be an independent reference clock. Alternatively, the reference clock 401 may derive its timing signals, such as an 8 kHz clock signal, from the reference time source 104 in a manner known in the art. Synchronization signals with frequencies that are non-integer multiples or rational fractions of the reference clock 401 are phase-locked to predetermined values of cycle and bus time of the nodes 400 and 402, thereby removing the requirement for a lower frequency reference.

Figure 5:
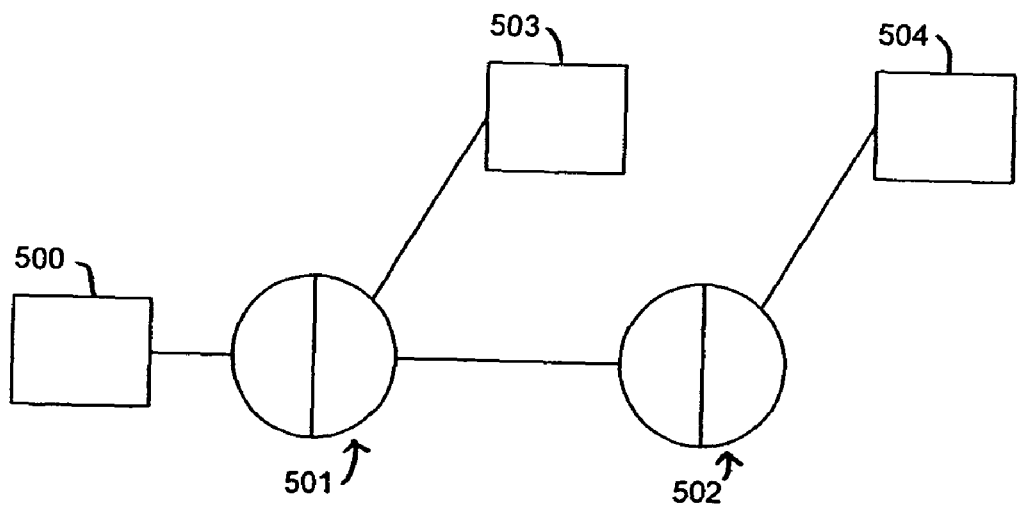
FIG. 5 illustrates delay compensation for aligned play-out of streams traveling paths with differing propagation delay.

Referring to FIG. 5, another subset of nodes is shown to illustrate delay compensation. For a node 500 transmitting a data stream as a "talking" node, the data stream may be routed over network devices 501, 502, which may be, in a preferred embodiment, IEEE 1394-compatible serial bus bridges. When several nodes 503 and 504 receive or "listen" to a data stream issued by a talking node 500, and the path between talker and listeners is routed over network devices 501 and 502, delay compensation is performed within the node 503 and/or the network devices 501 which are "nearer" to the talking node 500 by adding an extra signal delay. Such delay compensation is performed to guarantee simultaneous presentation of the streams, also known as aligned play-out, at nodes 503 and 504; for example, for substantially simultaneous webcasts of news events over media-based nodes.

Alternatively or in addition, such delay compensation over the network 100 is used to facilitate simultaneous recording, aligned capture, and/or aligned "play-in" of data from streams or sources via the nodes 503, 504 and/or their associated applications 105 and devices.

Figure 6:
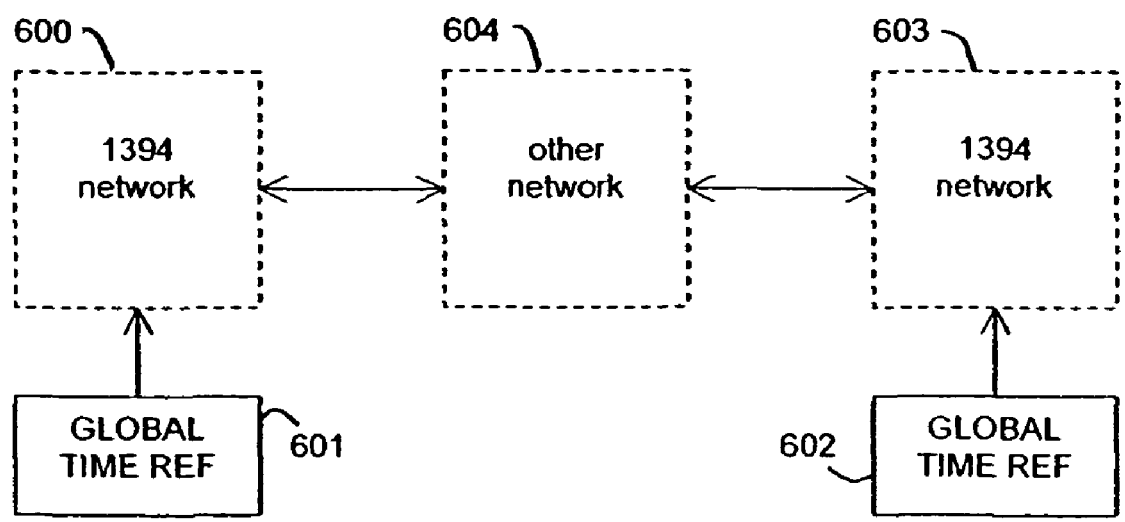
FIG. 6 illustrates the synchronization of IEEE 1394 network islands via a network-wide time reference.

Referring to FIG. 6, multiple time references 601, 602 may be used to facilitate synchronization of networks 600, 603 of one type with each other, even though the networks 600, 603 may be "islands", separate from each other yet connected by a network 604 of a second type which may not support or transport reference timing signals. Time references 601 and 602 are aligned by known synchronization techniques or methods, such as synchronization schemes which are not part of the networks 600, 603, 604 such as, for example, the global positioning system (GPS). For example, the networks 600, 603 may be IEEE 1394-compliant networks which are interconnected by a network 604 that is not IEEE 1394-compliant and/or not capable of transporting reference timing signals. Alternatively, one or more of the networks 600, 603 may be non-IEEE 1394-compliant networks which may transport reference timing signals, while the interconnecting network 604 cannot transport such reference timings signals. However, the applications or devices connected to nodes of the network 600 may be synchronized to the applications or devices of the network 603 using a common timing reference provided by the time references 601 and 602 of each associated network, instead of local time references.

That is, using the time references 601, 602, the disclosed reference time distribution system and method implement networks 600, 603 which do not require a compatible connection therebetween to support or transport such time references 601, 602. Thus, reference time distribution may be performed across heterogeneous networks having segments or devices of different types and/or complying with different communications standards or protocols. For example, reference time distribution may be performed over and between an IEEE 1394 network connected to an Ethernet, 802.3, or other local area network (LAN), metropolitan (or medium) area network (MAN), or wide area network (WAN), and so disparate devices may be networked and may use the reference time signals for synchronization and aligned play-out of data streams to diverse applications on either network.

In alternative embodiments, the network 604 in FIG. 6 may be a non-IEEE 1394 network able to or enabled for transporting a reference time, for example, using an Ethernet-based or 802.3-based network device, so in such alternative embodiments, a single network-wide time reference signal may be used, as in FIG. 1, and so the time reference source 602 provided in the configuration in FIG. 6 is no longer required.

What is claimed is:
1. A method for distributing a reference time in a network having a plurality of nodes, the method comprising the steps of:
generating a network-wide time signal using a reference time generator;
distributing the network-wide time signal over the network to the plurality of nodes wherein each node is configured to generate different synchronization signals for different applications connected thereto;
measuring a signal propagation delay of the network-wide time signal between the reference time generator and each of the plurality of nodes, the step of measuring further characterized by the steps of:
- maintaining a network-wide time signal as a network cycle master signal at a designated cycle master node of the plurality of nodes of the network;
- maintaining a local cycle master signal at each respective node of the network; and
- determining the signal propagation delay at each respective node from the difference between the respective local cycle master signal and the network cycle master signal;
- generating, at each respective node, local synchronization signals using the measured signal propagation delay of the respective node, each of the generated local synchronization signals being required by a respective application; and
- synchronizing the timing of each node for the respective applications using the respective local synchronization signals.

2. The method of claim 1, characterized in that the network cycle master signal and each local cycle master signal is stored in a respective network cycle master register and local cycle master register, at each respective node.

3. The method of claim 1, characterized in that the network-wide time signal is a house synchronization (synch) signal.

4. The method of claim 1, characterized in that the local synchronization signal has an associated frequency.

5. The method of claim 1, characterized in that the step of synchronizing includes the step of:
- phase locking the local synchronization signal to a predetermined cycle value.

6. The method of claim 1, characterized in that the step of synchronizing includes the step of:
- performing delay compensation at each respective node.

7. The method of claim 6, characterized in that the delay compensation is performed by adding an extra signal delay to the local synchronization signal.

8. The method of claim 1, characterized in that the plurality of nodes includes:
- at least one IEEE 1394-compliant node.

9. The method of claim 1, characterized in that the step of generating the network-wide time signal includes the step of:
- utilizing a rubidium reference signal generator.

10. The method of claim 1, characterized in that the step of generating the network-wide time signal includes the step of:
- utilizing a global positioning system (GPS)-based reference signal generator.

11. A system comprising:
- a network including a plurality of nodes and a reference time generator for generating a network-wide time signal, wherein a designated node of the plurality of nodes is connected to the reference time generator, and has means adapted to distribute the network-wide time signal over the network to the plurality of nodes, characterized in that each node of the plurality of nodes of the network has means adapted to generate different synchronization signals for different respective applications connected thereto and measure a signal propagation delay of the network-wide time signal between the reference time generator and each node and generate a local synchronization signals using the measured signal propagation delay, as required by the respective applications, and has means adapted to synchronize the timing of each node for the respective applications using the local synchronization signals, and further characterized in that the designated node has means adapted to maintain the network-wide time signal as a network cycle master signal; and each respective node of the plurality of nodes has means adapted to maintain a local cycle master signal and has means adapted to determine a respective signal propagation delay at each respective node from the difference between the respective local cycle master signal and the network cycle master signal.

12. The system of claim 11, characterized in that the designated node includes a network cycle master register for storing the network cycle master signal and each node of the plurality of nodes of the network includes a respective local cycle master register for storing the local cycle master signal.

13. The system of claim 11, characterized in that the plurality of nodes includes:
- at least one IEEE 1394-compliant node.

14. The system of claim 11 being adapted for facilitating timing functions in a network (100), the system characterized by:
- each node having means adapted to perform local timing control; and
- a plurality of applications using timing functions under local timing control, with each node of the plurality of nodes associated with at least one application
- wherein each node of the plurality of nodes of the network has means adapted to synchronized the at least one application associated with the respective node using the local synchronization signal.

15. The system of claim 14, characterized in that the designated node has means adapted to maintain the network-wide time signal as a network cycle master signal in a network cycle master register; and
- each node has means adapted to track signal propagation delay using the network-time signal, and has means adapted to convert the network-time signal by generating the local synchronization signal using the signal propagation delay of the respective node, to maintain a respective local cycle master signal in a respective local cycle master register, and to determine a respective signal propagation delay at each respective node from the difference between the respective local cycle master signal and the network cycle master signal.

16. The system of claim 14, characterized in that the plurality of nodes includes: at least one IEEE 1394-compliant node.

* * * * *